Sept. 25, 1934.  W. OWEN  1,974,627
DEVICE FOR USE IN CUTTING GLASS
Filed March 15, 1932
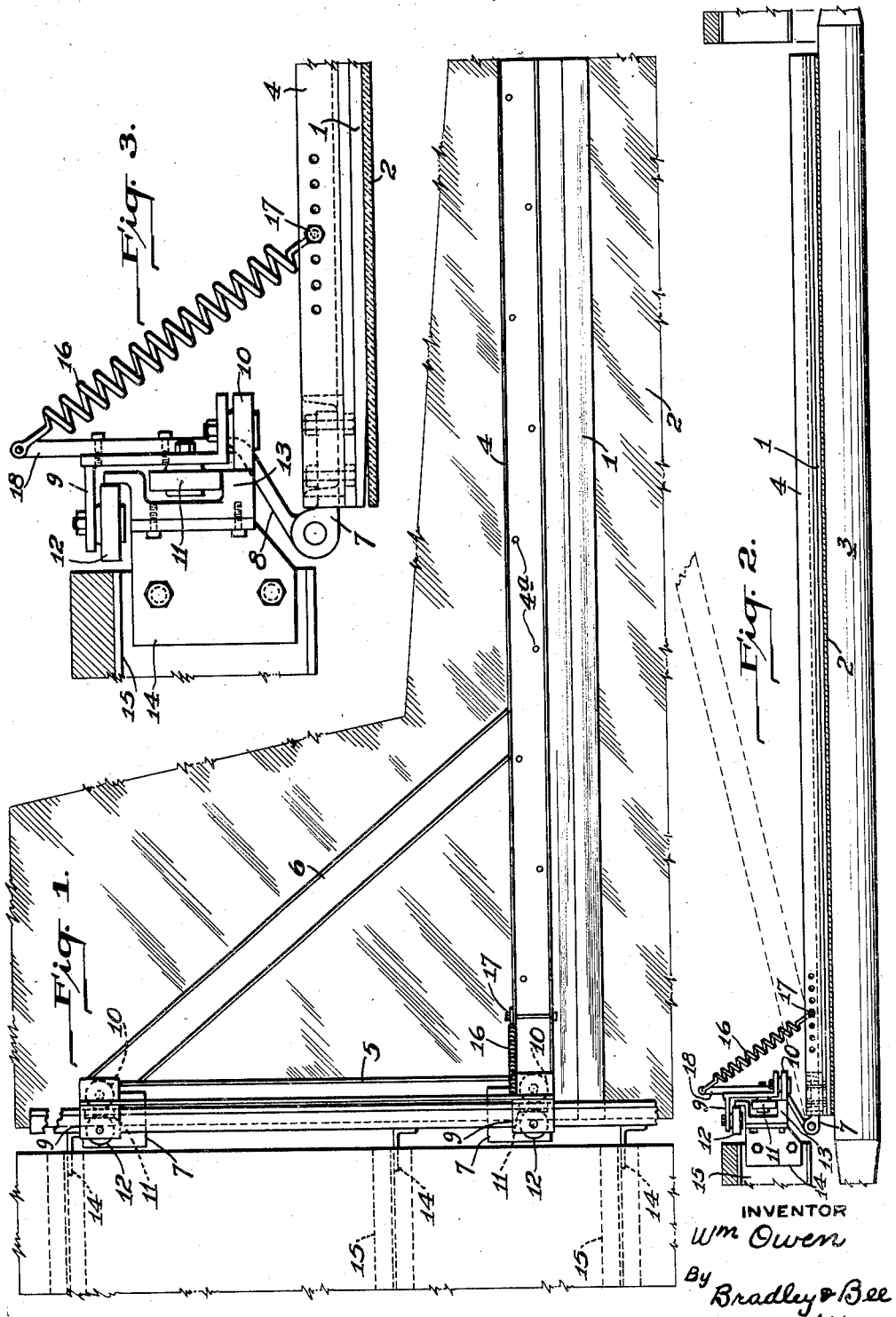
INVENTOR
Wm Owen
By Bradley & Bee
Attys.

Patented Sept. 25, 1934

1,974,627

UNITED STATES PATENT OFFICE

1,974,627
DEVICE FOR USE IN CUTTING GLASS

William Owen, Pittsburgh, Pa., assignor to Pittsburgh Plate Glass Company, a corporation of Pennsylvania Application March 15, 1932, Serial No. 598,983

3 Claims. (Cl. 33—32)

My invention relates to a device adapted to facilitate cutting sheet glass and it is particularly constructed to be utilized in conjunction with standard conveying mechanisms.

The invention has for its principal object the provision of a mechanism that may be positioned upon a traveling sheet of glass to move therewith while the cutting operation is performed. The device is of simple and rigid construction and so mounted as not to impede the ordinary manipulation of the traveling sheet of glass.

The objects and advantages of my invention will be apparent from the following description when considered in conjunction with the accompanying drawing in which like numerals indicate corresponding parts.

In the drawing Fig. 1 is a plan view of a device constructed in accordance with my invention; Fig. 2 is a side view thereof, partially in cross section and partially in elevation; and Fig. 3 is a detail view of a portion of the device, drawn upon a larger scale.

As shown in the accompanying drawing, the device includes a relatively wide flat member 1 formed with a straight edge which is adapted to engage a sheet of glass 2 that it is desired to cut. The glass is ordinarily conveyed by a series of rollers 3 from the leer, not shown, to an inspection shed and subsequently to devices for handling pieces of the glass that are cut to size. The device of my invention is accordingly mounted adjacent the inspection shed in order that the glass may be cut before being conveyed to the various handling devices. A channel member 4, formed of aluminum or any suitable material, is secured by a plurality of screws 4a, to the member 1 and welded to a plurality of members 5 and 6 to provide a relatively rigid structure.

Since it is only necessary to utilize the straight edge of the member 1 at intervals, it is desirable to provide means for automatically moving the structure to an inoperative position where it will not interfere with other operations upon the glass. Accordingly, the structure formed of the members 1, 5 and 6 is secured to a plurality of members 7 that are pivotally attached to angular arms 8 at each end of member 5. The angular arms 8 are attached to a frame 9 which has a plurality of roller bearings 10, 11 and 12 mounted thereon. These roller bearings are adapted to ride upon a track 13 so that free movement of the structure is provided, although it is maintained accurately in position. The track 13 is secured by means of a plurality of angle irons 14 to frame work 15 adjacent the conveyor for the glass. A spring 16 is secured to the channel member 4, as indicated at 17 and to a rod 18 mounted upon the frame 9.

It will be apparent from the foregoing description that the member 1 is ordinarily held in an inoperative position by the spring 16, as indicated by the broken lines in Figure 2. When it is desired to cut the glass, it is only necessary to depress the member to engage the glass and it will travel therewith by reason of the structure being carried by the roller bearings 10, 11 and 12 mounted at each end of the member 5. The glass is cut, of course, in an ordinary manner by drawing a suitable glass cutter along the edge of the member 1, whereupon the sheet is cracked in a manner well known to glass cutters.

Obviously the device of my invention provides a very simple means that is convenient to operate and will not interfere with the customary operations in handling the glass sheet. Moreover, the device may be positioned upon the glass at any convenient place along the conveyor and in consequence of such flexibility of movement it lends itself to varied operations.

Although I have described a specific embodiment of my invention, it is obvious that minor modifications may be made therein without departing from the spirit or scope thereof and I desire, therefore, that no limitations shall be imposed upon the appended claims except as may be dictated by the prior art.

What I claim is:

1. A device for use in cutting glass comprising a supporting mechanism mounted for movement at one side of a glass conveyor, a member provided with a straight edge pivotally secured thereto and a spring connected to the supporting mechanism and the member, whereby the member is yieldably retained in an inoperative position.

2. A device for use in cutting glass comprising a supporting mechanism mounted for movement at one side of a glass conveyor, a member embodying a straight edge pivotally mounted upon the mechanism whereby the member may be swung away from the glass to a position at one side thereof and yieldable means tending to maintain the member in an inoperative position.

3. A device for use in cutting a glass sheet supported on a conveyor, comprising a track along one side of the conveyor, a carrier mounted for movement along the track, a straight edge pivoted to the carrier for swinging movement toward and from the glass sheet, and yielding means on the carrier tending to maintain the straight edge out of contact with the glass sheet.

WILLIAM OWEN.